Sept. 9, 1969  J. B. FENN  3,465,500
METHOD AND APPARATUS FOR SEPARATION OF COMPONENTS
FROM GASEOUS STREAMS
Filed April 19, 1968  2 Sheets-Sheet 1

INVENTOR.
JOHN B. FENN
BY Theodore B. Roessel
ATTORNEY

Sept. 9, 1969    J. B. FENN    3,465,500
METHOD AND APPARATUS FOR SEPARATION OF COMPONENTS
FROM GASEOUS STREAMS
Filed April 19, 1968    2 Sheets-Sheet 2
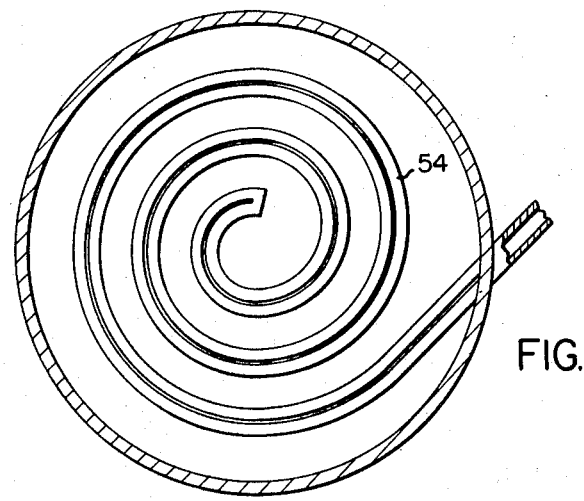
FIG. 5
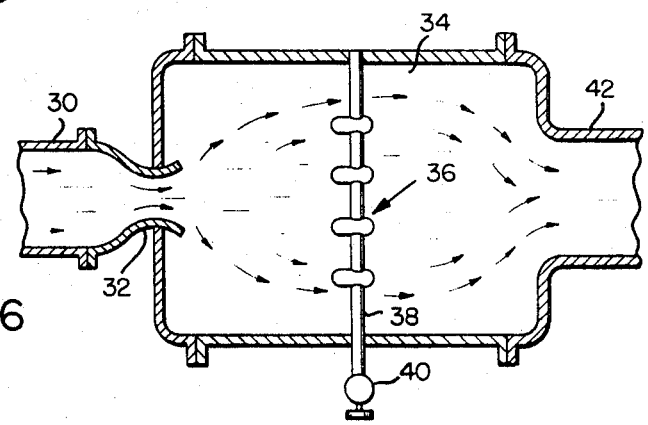
FIG. 6
FIG. 7
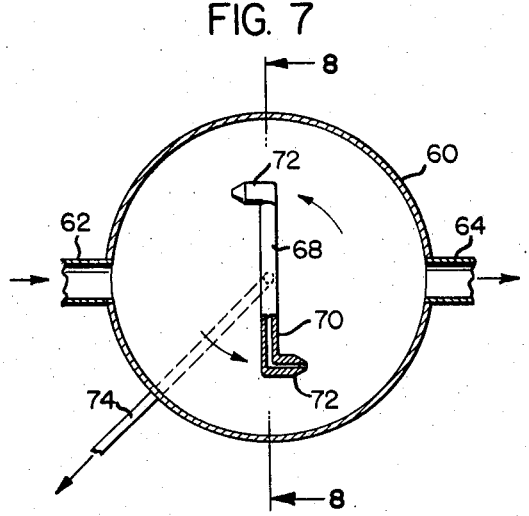
FIG. 8
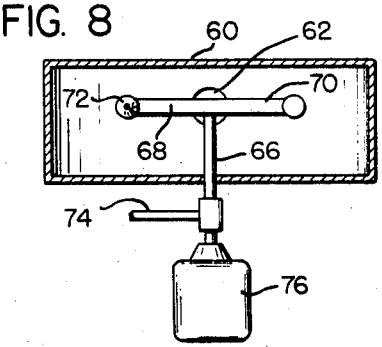
INVENTOR.
JOHN B. FENN
BY Theodore B. Roessel
ATTORNEY

United States Patent Office 3,465,500
Patented Sept. 9, 1969

3,465,500
METHOD AND APPARATUS FOR SEPARATION OF COMPONENTS FROM GASEOUS STREAMS
John B. Fenn, 120 Everit St., New Haven, Conn. 06511
Continuation-in-part of application Ser. No. 272,592, Apr. 12, 1963. This application Apr. 19, 1968, Ser. No. 725,578
Int. Cl. B01d 57/00
U.S. Cl. 55—17        10 Claims

ABSTRACT OF THE DISCLOSURE

Method and apparatus for separating the components of a gaseous mixture containing heavier and lighter species, comprising accelerating the mixture to form a stream flowing at supersonic velocity, placing either a single hollow probe of suitable shape, or a plurality of hollow probes, distributed throughout a transverse cross-section of the stream, to form shock waves in front of the leading edges of each probe, whereby the heavier species flows forward into the mouth of the probe and the lighter species is deflected so that it flows around the probe, maintaining reduced pressure within the probe (or probes) and withdrawing gas, enriched in the heavier species, from the probe (or probes).

---

This application is a continuation-in-part of application Ser. No. 272,592 filed Apr. 12, 1963, now abandoned.

This invention relates to a method and apparatus for the separation of components from mixtures in the gaseous state and more particularly to the separation of one or more components of said mixtures by the application of high inertial forces in supersonic gaseous streams.

The separation of components of gaseous mixtures has long proved to be a difficult problem, and no really satisfactory solution has yet been set forth. Various methods, such as differential diffusion through semi-permeable membranes, differential absorption, partial or complete liquefaction of one component, liquefaction of the mixture and subsequent fractional distillation or rectification, and the like have been used in the past, depending on the properties of the gases involved, cost factors and other criteria. However, all of these methods have proved costly and inefficient. The provision of the more efficient direct means of separation, which is economical in operation and involving relatively simple apparatus, is the principal object of this invention.

It has recently been discovered by workers in this field when a mixture of gases is expanded through a nozzle into an evacuated region, producing a jet having supersonic velocity, and a sampling probe is placed on the axis of this jet, the gas withdrawn through the probe will be richer in one of the components than the composition of the original gas. Usually, but not always, it is the heavier species which is found in higher concentration on the jet axis. Depending on the velocity of the gas mixture, the difference in properties between the various components of the mixture, the pressure upstream of the nozzle and in the evacuating region, and the distance between the probe and the nozzle exit, various degrees of separation or concentration of one component have been attained in the gas drawn out around and through the probe. For example, under the conditions described above, a good separation of argon from a helium-argon mixture was achieved.

The explanation advanced for this separation was that under conditions existing in the case of a free, supersonic jet surrounded by an area of low pressure and stagnant gas, one of the species would diffuse in a radial direction with greater velocity than the other and, thus, the composition of the jet would vary from the center outwardly towards the periphery, with the gas having the smallest diffusion constant being concentrated on the axis of the jet and the more diffusive gas being concentrated toward the periphery of the jet.

This discovery and its theoretical explanation formed the basis for a proposed process separating the components of mixtures of gases based on the relative diffusivity of the components of the mixture. Specifically, it was suggested that the gas be discharged through a nozzle into an evacuated chamber to form a free supersonic jet and that a probe be inserted in this jet on the axis thereof, and that a portion of the gas be withdrawn through this probe. This would serve as a means for removing a portion of the mixture richer in the gas having lower diffusivity while the remainder of the gas, which passed the probe, would be correspondingly enriched in the species having higher diffusivities. However, no practical use has been made of this discovery, because of its inherent shortcomings. In the first place, in order to utilize this process, it was necessary to utilize a "free" jet, that is, a jet in a region of very low pressure surrounded by a layer of stagnant gas so that the postulated diffusion from the axis of the jet outwardly to the periphery would be maximized. In practice, it appeared that the ambient pressure would have to be as low as 0.1 millimeters of mercury and preferably less. The jet could not be in direct contact with confining walls without drastically reducing the postulated driving force underlying the separation. In the second place, an enormous amount of gas would pass the sampling probe, relative to the small amount withdrawn from the probe, and thus, the degree of separation would be very small. This meant that such a process would be enormously inefficient. For these reasons, no interest has been shown in further development or commercial utilization of such a process. Even in the area of separation of isotopes, where cost is a secondary consideration, such a process could not hope to compete with even such inefficient methods as the gaseous diffusion process now in use for this purpose. Moreover, a large amount of apparatus would be necessary since in order to effect the separation in anything approaching commercial quantities, a very large number of small jets would be required. This would require a large number of pumps for producing the requisite gas flow, and for recompressing and passing the gas through successive stages in order to effect any commercially useable separation. All in all, it could be seen that this process, while it excited some interest and scientific curiosity, was completely impracticable and uneconomic as a commercial process.

I have discovered that a separation can be effected in high velocity gaseous streams under conditions differing markedly from those heretofore known and described above. Specifically, I have discovered that if a gaseous stream and a sampling probe are moving relative to each other at supersonic velocity, under conditions which will generate and maintain a standing shock wave, at or just ahead of the leading edge of the probe, the composition of the gas withdrawn from the stagnation zone immediately behind the shock wave differs markedly in composition from the bulk of the gas mixture. This is a separation differing completely in principle from the process described above in that it depends not on the diffusivity of the gases from a supersonic stream to an area of stagnation surrounding the stream but, on the contrary, depends on an inertial effect on the various components of the mixture caused by the extremely high decelerations taking place as the molecules pass through a standing shock wave to the area of stagnation immediately behind this wave. In other words, it is, in effect, an inertial separation depending on the relative mass of the particles in the gas and (except for side effects) is not directly dependent on the diffusion constants of the gases themselves. This make it possible to effect the separation of the components of a gaseous mixture moving in a supersonic stream by placing probes anywhere in the supersonic stream, either on the axis or near the periphery, since the shock wave will be generated by the probe itself wherever it may happen to be. The inertial separation will take place in or behind the shock wave irrespective of the position of the shock wave with respect to the dimensions of the stream itself. There is no necessity for the use of a "free" jet or for the stream to be unconfined. On the contrary, this separation can be carried out in a supersonic stream which completely fills the conduit, and separation can be carried out near the walls of said conduit without any substantial diminution in the efficiency thereof. This means that a plurality of probes may be inserted in any given supersonic stream and the separation effected at a number of separate locations spaced along a transverse cross section of the stream without regard to the position of each probe with respect to the axis of the supersonic stream.

Other advantages accrue from the use of this inertial principle. Streams of relatively large cross section may be efficiently used since the probes or separation points may be spaced along the entire cross section thereof. In contrast to this, the previously described separation process can use only one probe for removing the low diffusivity component at the center line of the stream. This necessitated the use of a plurality of jets of relatively small cross section since the area of the stream which was spaced away from the center line could not be used for additional separation locations.

A further advantage of my separation process is that since the separation depends only on a shock wave, only relative motion of the gas and the probe is required. This dispenses entirely with the necessity for a supersonic stream since a probe moving with supersonic velocity through stationary gaseous mixture will set up shock waves which will effect the separation equally well. My method of separation can, therefore, also be used under conditions where the formation of a supersonic jet in a closed conduit is impractical or uneconomical.

Other advantages of this invention will be apparent in the following description of several embodiments of my invention which are to be construed as illustrative and not in a limiting manner.

In the drawings:

FIG. 5 is a view similar to FIG. 4, showing a modified form of probe;

FIG. 6 is a view similar to FIG. 1, showing a further modified form of my invention;

FIG. 7 is a schematic, fragmentary, top plan view, partly in section of another embodiment of my invention; and FIG. 8 is a cross sectional view taken substantially along line 8—8 of FIG. 7.

Figure 1:
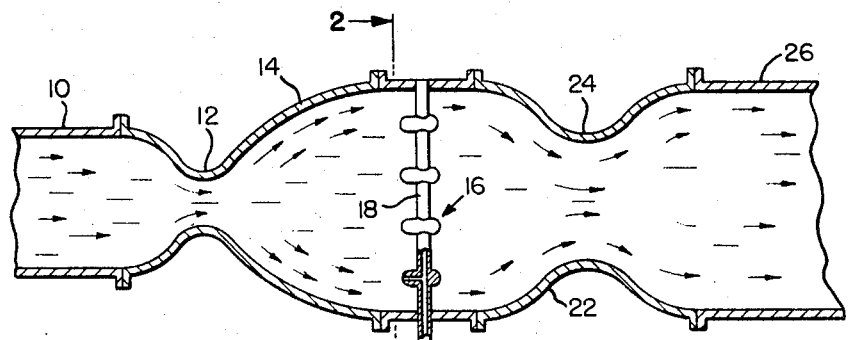
FIG. 1 is a fragmentary, schematic, longitudinal cross sectional view of an apparatus embodying the present invention.
Figure 2:
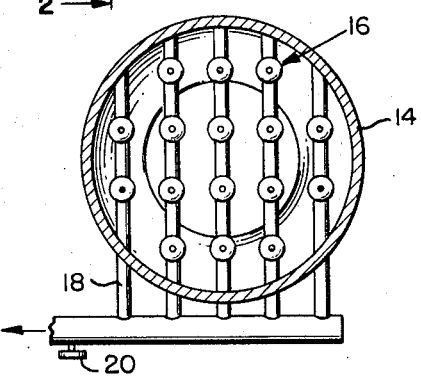
FIG. 2 is a cross sectional view taken substantially along line 2—2 in FIG. 1.

In the drawings, FIGS. 1 and 2 are a schematic representation of one stage of an apparatus embodying my invention. A gaseous mixture of isotopes or chemically different species at relatively high pressure flows in the direction indicated by the arrows through duct 10 having come from a pump or other suitable source (not shown). It accelerates in the converging portion of nozzle 12 until it reaches sonic velocity at the throat and then expands to supersonic velocities in the diverging section 14 of the nozzle until it reaches an array of probes shown generally at 16 spaced across the entire area of supersonic flow. The design of the probes is important and will be discussed subsequently. Some of the gas is withdrawn through the probes into a manifold 18 which contains throttling valve 20 and can then be pumped into another stage similar to the one shown; the process can be repeated with a consequent further enrichment of the gas withdrawn. The portion of the main stream which is not withdrawn from probes 16 flows around them into a converging section 22 in which the gas diffuses to a higher pressure and lower velocity reaching sonic velocity at the smallest cross section 24 after which it can be diffused subsonically to still lower volocities and higher pressures as it passes out through exit duct 26. The exhaust from duct 26 can be passed into a suitable compressor (not shown) and boosted to a suitable pressure for reprocessing in another stage similar to the one described. It will be readily apparent that, depending upon the effectiveness of separation in any stage and the desired degree of separation, any number of stages can be placed in various combinations or sequences.

It is, of course, not necessary that my invention be practiced as shown in FIGS. 1 and 2. It is also possible to use a free jet as in the prior art and as shown in FIG. 6. Here, gas at relatively high pressure from a source (not shown) is brought through duct 30 to nozzle 32 which exhausts into chamber 34. The nozzle may be a simple converging nozzle in this case, since expansion to supersonic velocities will occur if the pressure in chamber 34 is maintained at a value of less than about half the pressure in duct 30. In other words, to achieve supersonic velocity it is necessary to maintain a pressure ratio across the nozzle greater than about 2 to 1. The higher the pressure ratio across the nozzle the greater the Mach number that can be achieved. The requirements of pressure and area ratios in nozzles to achieve particular Mach numbers are well known and will not be described here. Suffice it to say that I have found it desirable to employ free stream Mach numbers, whether in the configuration of FIG. 1 or FIG. 6, substantially higher than 1 and preferably of the order of 2 or 3 or more. I have found greatest separations usually above a Mach number of 4. These desired Mach numbers should obtain in the flow immediately upstream of the probe array shown generally in FIG. 6 at 36. These probes are connected to a manifold 38 leading to exit duct 40 which contains a valve. The gas which passes around the probes is exhausted through duct 42 to a suitable pump which must have capacity sufficient to maintain the desired pressure level in chamber 34.

I have found that the pressure or rather the density, which must be maintained in the free stream depends critically upon the characteristic dimension of the foremost portion of the probe. The separation which occurs depends upon the deceleration consequent to the near stagnation of high velocity gas at the probe entrance. The greatest deceleration occurs when the characteristic dimension of the probe is small. In the supersonic stream required in the practice of my invention the deceleration occurs beginning with a shock wave which is caused by the presence of the probe in the stream. The distance between the shock wave and the probe entrance depends upon the characteristic dimension of the front end of the probe. In the case that the probe is a body of revolution, such as a cylindrical tube, the characteristic dimension is the diameter of the tube. If the front end of the probe is conical the diameter at the leading edge is the important dimension. I have found, in general, that it is preferable to hold this characteristic dimension of the probe to a value smaller than approximately 50 times the mean free path length in the free stream of the gas. Those skilled in the art will recognize that this is equivalent to saying that the Knudsen number of the flow, i.e., the ratio of gas mean free path to characteristic dimension based on the probe's leading edge, would be greater than about 0.02. Preferably, the Knudsen number should be 0.2 or higher, but economic or other practical factors may dictate departures from this theoretically desirable norm. It is clear that the pressure or density which can be used in the high velocity stream will depend upon how small one can effectively make suitable probes.

Separation can also be effected at higher pressures, that is, above 10 millimeters of mercury. However, since the Knudsen number depends not only on the probe diameter but also on the mean free path of the molecules in the gas it is evident that an increase in pressure (and a consequent increase in density of the gas) will result in a decreased Knudsen number for a probe of given diameter. For this reason, an increase in pressure will require the use of probes of smaller diameter, other things being equal.

Figure 3:
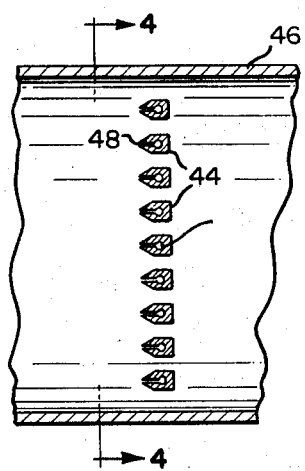
FIG. 3 is a view similar to FIG. 1, showing a modified form of my invention.
Figure 4:
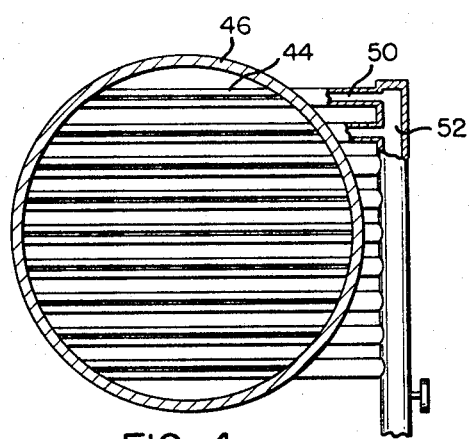
FIG. 4 is a cross sectional view taken substantially along line 4—4 in FIG. 3.

In the case of a probe of circular cross section, the cross sectional area varies as the square of the diameter. Since the mean free path of the molecules varies substantially directly as the pressure, the mass flow of gas which would be withdrawn through a probe of a given Knudsen number would decrease with an increase in pressure and a corresponding decrease in the probe diameter. It, thus, appears to be most efficient to use low pressure and relatively large diameter probes; however, due to pumping costs and other considerations, high pressures may be more desirable in certain particular instances. Moreover, increased viscosity effects which occur at lower pressures may offset this apparent advantage of lower pressure. In the case of a "linear" probe such as shown in FIGS. 3, 4 and 5, the characteristic dimension, the width of the slit varies directly as the first power of pressure. In this case, changes in pressure and corresponding changes in probe dimensions to maintain a constant Knudsen number should cancel each other out. Since other considerations such as the cost of pumps and other machinery favors high pressures, in this embodiment higher pressures would be used.

The following examples will serve to provide typical sets of conditions for achieving effective separation:

EXAMPLE 1

A mixture of 80% hydrogen and 20% nitrogen at a total pressure (upstream of nozzle) of 200 mm. Hg was expanded to a Mach number of about 6. Probes comprising ⅜ inch diameter tubes terminating at the upstream end in a hollow truncated cone having an exterior angle of 60° and a sharp edged inlet 0.0312 inch in diameter were immersed in the stream. The probes were connected to a vacuum pump which maintained a pressure of 205 microns at its inlet. Under these conditions the composition of the gas withdrawn through the probes was 75% hydrogen and 25% nitrogen representing an enrichment in nitrogen of about 5%. For the conditions described in Example 1 the effective Knudsen number was approximately 0.08. There is another point worthy of note. There was a throttling valve in the line from the probes to the vacuum pump. In Example 1, this valve was open all the way. When this valve was partially closed, it had the effect of lowering the pressure at the inlet to the pump and raising the pressure in the probes. Unfortunately, there was no way to measure the actual pressure in the probe. However, an indication of the increase in probe pressure was possible by noting the decrease in pressure at the pump inlet due to throttling. When the throttling valve was closed to the point where the pressure at the inlet to the pump was reduced from 205 microns as in Example 1 to 100 microns, the concentration of nitrogen in the gas withdrawn through the probes was increased to 52% and the concentration of hydrogen was reduced to 48%. This corresponds to an enrichment of 32% in nitrogen compared to only 5% enrichment when the throttling valve was wide open. Further closing of the throttling valve to the point where the pump inlet pressure was 53 microns resulted in decreasing the hydrogen content of the probe gas to 36% and increasing the nitrogen content to 64% corresponding to an enrichment in nitrogen to 44% from the original value in the source gas of 20%. Still further closing of the throttling valve did not result in further enrichment of nitrogen but actually brought about decreased separation. Thus, when the pump inlet pressure was 37 microns the nitrogen concentration dropped to about 60%.

EXAMPLE 2

A mixture of 50% nitrogen and 50% hydrogen at a total source pressure of 50 mm. Hg was expanded to a Mach number of about 7. Probes identical with those used in Example 1 when immersed in this supersonic stream allowed gas to be withdrawn which had a hydrogen concentration of 20% and a nitrogen concentration of 80% corresponding to a nitrogen enrichment of 30% relative to the source gas composition.

EXAMPLE 3

A mixture of 58% nitrogen and 42% argon at a total source pressure of 16 mm. Hg was expanded to a Mach number of about 7. Sharp edged conical shaped probes having an effective diameter of 0.03 inch at the leading edge when immersed in the stream withdrew gas having about 54% nitrogen and 46% argon corresponding to a 4% increase in argon concentration.

EXAMPLE 4

A mixture of 21.3% oxygen and 78.7% nitrogen at a total source pressure of 10 mm. Hg was expanded to a Mach number of about 5. Probes the same as those used in Example 3 when immersed in the stream resulted in the withdrawal of gas having a composition of 78% nitrogen and 22% oxygen.

EXAMPLE 5

A mixture of 80% hydrogen and 20% nitrogen was expanded from a total source pressure of 50 mm. Hg to a Mach number of about 3. Probes identical with those used in Example 1 resulted in withdrawal of gas having a composition comprising 60% hydrogen and 40% nitrogen.

EXAMPLE 6

A cylindrical probe having a hemispherical front end and an outside diameter of 3.17 mm. was placed on this axis of a supersonic jet at a Mach number of 10. The isentropic stagnation pressure was 100 torr and the stagnation temperature was 298° K. The jet gas comprised a mixture of 10 percent argon and 90 percent helium. Gas withdrawn through a small (0.64 mm.) sampling orifice at the stagnation point of the probe was found to contain 30 percent argon and 70 percent helium. Gas samples withdrawn from identical probes located at three distances from the axis in the same jet out to almost the edge were found to contain respectively 29, 28 and 31 percent argon.

EXAMPLE 7

Cylindrical probes having hemispherical front ends and outside diameters of 3.17 mm. were placed in a supersonic flow field in which the streamlines had a radial distribution as in a source flow. The probes were placed coaxially with streamlines at 0, 10, 25, 30 and 55 degrees from the jet axis. The Mach number at each probe was about 10. Gas withdrawn from each probe was found to contain from 38 to 39 percent argon. The free stream composition of the gas was 10 percent argon and 90 percent helium. The stagnation temperature was 298° K. and the stagnation pressure was 40 torr.

It is clear from this discussion that controlling the pressure in the probe downstream from its entrance can have a profound effect on the degree of separation which is attainable. The exact characterization of probe pressure is difficult and optimum values will depend upon free stream conditions, probe design, mixtures to be separated and the like. It is, therefore, desirable in practicing the invention to provide means for varying at will the pressure in the probe. There are many possible ways of accomplishing this. In FIGS. 1 and 2 and in Example 1 the control was effected by means of a throttling valve in the line leading from the probe manifold to the withdrawal means, e.g., a vacuum pump. Effective control could also be exercised by having a variable capacity withdrawal means. When optimum design values have been determined for a particular separation process, it would be possible to put a fixed throttling restriction in the withdrawal line. This same result could be accomplished by controlling the size of the inlet aperture at the front end of the probe relative to the effective characteristic size or dimension of the probe. In the simple cylinder case, for example, the outside diameter of the front end of the probe could be 0.03 inch as in Example 1, but the actual inlet aperture could be any size smaller than this. Similarly, for known optimum conditions a particular capacity pump in the line from the probes would provide the desired values for probe pressure.

From the foregoing discussion, it is apparent that the design of the probes to be used in practicing the invention is very important. The importance of the characteristic dimension at the front end or leading edge has already been emphasized. As has been mentioned, this dimension depends upon the mean free path in the oncoming gas ahead of the probe, i.e., the free stream value. It will be sufficient for those skilled in the art to assert that the Knudsen number based on probe width or diameter at the leading edge and the free stream mean free path should be higher than about 0.02. Separation can be achieved at smaller values of Knudsen number but is usually better at higher values. Although we have not proved it, there is evidence that at values of Knudsen number greater than about 10 there will be little or no separation, probably because the regime of free molecule flow will have set in and there will be no shock wave ahead of the probe.

A stated above, the probes can be arranged in any suitable pattern in a transverse cross section of the supersonic stream. However, it should be pointed out that the probes should be placed sufficiently far from each other to allow clear passage for the main supersonic stream between the probes. If the probes are too closely spaced, the individual shock waves set up in front of each probe will merge to form a single shock wave in front of all the probes. Under these conditions, the critical dimension would be the diameter of the entire array of probes, and the shock wave would be formed a long distance upstream from the array of probes. The separated gases would then diffuse into each other prior to reaching the probes, and the desired separation would not be effected. In other word the Knudsen number would be much smaller than the lower limit for which this invention is effective.

However, care must be exercised, since very low temperatures are obtained in any case where gas is expanded to high Mach numbers through an adiabatic nozzle and, in certain cases, the gases may actually be partially liquified if the initial temperature is allowed to fall sufficiently low.

Many probe configurations will readily occur to those skilled in the art. The most obvious configuration is that of a plurality of cylindrical tubes arranged in banks evenly distributed on a transverse cross section of the stream as shown in FIGS. 1 and 2. However, it is equally possible to use a "two dimensional" probe comprising essentially closely spaced knife edges arranged to form a narrow slit having characteristics as described above. Such an arrangement shown in FIGS. 3 and 4 comprises a plurality of long narrow collectors 44 extending transversely across conduit 46. Collectors 44 have narrow slit-like openings 48 communicating with passages 50 which allow the gas to be drawn off to a manifold 52.

In the case of a slit, the critical dimension is the width of the slit and this should not exceed approximately 50 mean free paths in the gas mixture flowing in the apparatus.

Another alternative is the use of the single two dimensional slit probe arranged in the spiral configuration so as to cover substantially the entire cross section of the conduit through which the gas is flowing. Such a spiral probe 54 is shown in FIG. 5. Other arrangements, falling within the spirit of this invention, will readily occur to those skilled in the art.

It is not necessary to use a stationary probe in a supersonic stream; a moving probe in a stationary atmosphere will work in the same manner. Thus, for example, it might be desired to practice my invention by mounting a suitable probe on an airplane traveling at supersonic speed in order to obtain a stream of atmospheric gas in which certain heavy species would be in higher concentration than in the atmosphere itself. For example, it might be desired to concentrate, for assay purposes, radioactive species formed in a nuclear explosion.

Other embodiments of this invention are possible without departing from the spirit thereof. For example, there is shown in FIGS. 7 and 8 a schematic representation of an apparatus for carrying out the separation according to my invention in a stationary or slowly moving body of gas. This embodiment comprises an outer casing 60 of substantially cylindrical cross section, and provided with inlet and outlet ducts 62 and 64, respectively. Suitable pumps, valves and gauges (not shown) are provided for providing a flow of gaseous mixture to inlet 62, through chamber 60 and out through outlet 64 while maintaining the desired pressure therein. A central shaft 66 is rotatably mounted in substantially axial location in chamber 60. A pair of hollow, radially extending arms 68 and 70 are provided, each of which terminates in a short hollow probe 72 extending in circumferential direction. Shaft 66 is hollow and is connected to an outlet 74 for withdrawal of a portion of the gaseous mixture. In operation, shaft 66 is rotated in a counter-clockwise direction as viewed in FIG. 7 by a motor 75 at a speed such that the tips of probes 72 were moving at a supersonic velocity through the gaseous mixture contained in chamber 60. This would cause the formation of shock waves at the tips of probes 72; the gas withdrawn through the probes would be enriched in one of the components through the mixture of the gas. Thus, separation can be achieved even though the gas itself were moving only relatively slowly. All such embodiments, wherein a gaseous mixture and probes are in relative motion at supersonic velocities, and a portion of the gaseous mixture is withdrawn from the area of stagnation behind the shock waves falls within the spirit of this invention.

In a case of gases having widely different densities, it is possible to carry out an efficient separation by adjusting the velocity of the gas stream to a value which is supersonic with respect to only one of the gases. As is well known to those skilled in the art, sonic velocity in a gas depends on its molecular weight; that is, the speed of sound will be lower in a heavier gas.

If the velocity of the stream is adjusted so that it is above sonic velocity for the heavier component but below sonic velocity for the lighter component, the separation will be particularly effective. At this velocity, only the heavier species will undergo shock and the consequent rapid deceleration and thus will be preferentially concentrated.

As stated above, the means used to withdraw a portion of the gaseous mixture may take any form within the limitations set forth and in the spirit of this invention. Accordingly, when used in the claims, the term "Probe Means" is intended to cover means of any shape suitable for withdrawal of gas, or a plurality of such means arranged in a suitable pattern.

Thus, it will be seen that this invention attains the stated objects. A method for the separation of gases which is relatively simple, inexpensive, and efficient has been provided. No complicated apparatus is required nor is any change in state of any of the components of the gaseous mixture required. The separation is independent of the chemical properties of the mixture and thus mixtures of istopoes can readily be separated on the basis of mass alone.

While I have shown and described the preferred form of mechanism of my invention it will be apparent that various modifications and changes may be made therein, particularly in the form and relation of parts, without departing from the spirit of my invention as set forth in the appended claims.

I claim:

1. An apparatus for separating the components of a mixture of gases, including heavier and lighter species, comprising:
    (a) means for causing said mixture to flow in a stream at supersonic velocity,
    (b) a plurality of probe means disposed in the path of said supersonic stream,
    (c) said probe means each having a flow passage with an axis,
    (d) all of said axes being separate and distinct from each other and being located in different transverse portions of said stream,
    (e) means for maintaining a relatively low pressure within each of said probe means, and
    (f) means for withdrawing an enriched component from the flow passage within each probe means which has been sampled by each of said probes.

2. Apparatus for separating the components of a mixture of gases, including heavier and lighter species, comprising:
    (a) means for causing said mixture to flow in a stream at supersonic velocity,
    (b) a plurality of probe means disposed in said stream and extending across a substantial transverse portion thereof, each of said probe means having an aperture, points located on the leading edges of which are located at varying distances from the central axis of said stream, said probe means each having a flow passage with an axis, all of said axes being separate and distinct from each other and being located in different transverse portions of said stream,
    (c) means for maintaining a relatively low pressure within said probe means, and
    (d) means for withdrawing an enriched component from the flow passage within each probe means which has been sampled by each of said probes.

3. Apparatus for separating the components of a mixture of gases, including heavier and lighter species, comprising:
    (a) means for causing said mixture to flow in a stream at supersonic velocity,
    (b) elongated probe means extending across a substantial section of said stream, consisting of at least one closely spaced knife edge member with a slit-like opening of substantially uniform width between knife edges,
    (c) means for maintaining a relatively low pressure within said probe means, and
    (d) means for withdrawing an enriched component from the flow passage within each probe means which has been sampled by each of said probes.

4. Apparatus according to claim 3 in which said probe means consists of a plurality of said knife edge members distributed through a substantial transverse portion of said stream.

5. Apparatus according to claim 3 in which said probe means consists of a knife edge member shaped in a continuous spiral.

6. Apparatus according to claim 3 in which said stream flows in a duct and completely fills said duct.

7. A process of separating the components of a mixture of gases, including relatively light and heavy species, said method comprising:
    (a) accelerating said mixture of gases through a nozzle such that it forms a stream that emerges at supersonic speed and expands to have a Mach number substantially larger than 1,
    (b) placing hollow probe means in the expanded stream at a sufficient distance from said nozzle to cause a shock wave to form ahead of said probe's leading edges,
    (c) selecting the distance between opposite leading outside edges of said probe, relative to the mean free path of the free stream of gas ahead of said probe such that the combination has a Knudsen number larger than 0.02 but less than 10,
    (d) maintaining a relatively low pressure in the interior of said probe,
    (e) whereby the effect of the shock wave causes a lesser deceleration of said heavier species than of said lighter species of said mixture and thus results in an increased relative concentration of said heavier species within said probe,
    (f) continuously withdrawing a portion of the gas stream through said probe enriched in said heavier species, and
    (g) determining the concentration of said heavier species and of said lighter species in the portion of the gas withdrawn through said probe and adjusting the pressure within the probe until the concentration of the heavier species is a maximum.

8. A process of separating the components of a mixture of gases, including relatively light and heavy species, said method comprising:
    (a) passing said mixture at relatively high pressure through a duct,
    (b) accelerating said mixture through a nozzle portion of said duct until said mixture reaches sonic velocity in a converging portion of said nozzle and then expands to form a supersonic velocity stream in a diverging portion of said nozzle following said converging portion,
    (c) placing an array of hollow probes in the supersonic stream at a sufficient distance from said nozzle to cause a shock wave to form ahead of each probe's leading edges, all of said probes being disposed entirely within the supersonic portion of said stream and said stream completely filling said duct, all of said probes having axes which are separate and distinct from each other and which are located in different transverse portions of said stream,
    (d) maintaining a relatively low pressure in the interior of each of said probes, and
    (e) continuously withdrawing a portion of the gas stream from the interior of each of said probes enriched in said heavier species.

9. A process of separating the components of a mixture of gases, including relatively light and heavy species, said method comprising:
    (a) accelerating said mixture of gases through a nozzle such that it forms a stream that emerges at supersonic speed and expands to have a Mach number substantially larger than 1,
    (b) placing a plurality of hollow probes in the expanded stream at sufficient distance from said nozzle and separated sufficiently from each other to cause a separate shock wave to form ahead of each of said probe's leading edges,
    (c) said probes each having a flow passage with an axis, all of said axes being separate and distinct from each other and being located in different transverse portions of said stream, (d) maintaining a relatively low pressure in the interior of each of said probes, and (e) continuously withdrawing a portion of the sampled gas stream from the interior of each of said probes enriched in said heavier species.

10. A process for separating the components of a mixture of gases comprising relatively light and heavy species comprising, in combination, the method steps of accelerating said mixture to a velocity which is higher than the speed of sound in said heavier species but lower than the speed of sound in said lighter species, inserting hollow probe means in said stream and withdrawing a portion of said mixture enriched in said heavy species, through said hollow probe means.

References Cited

UNITED STATES PATENTS 2,607,439  8/1955  Dickens et al. _____ 55—17

FOREIGN PATENTS 1,258,461  3/1961  France.

REUBEN FRIEDMAN, Primary Examiner

CHARLES N. HART, Assistant Examiner

U.S. Cl. X.R.

73—212